United States Patent [19]

Thun

[11] Patent Number: 5,507,694
[45] Date of Patent: Apr. 16, 1996

[54] PASS-OVER TAPPING APPARATUS

[75] Inventor: Ernst Thun, Hagen, Germany

[73] Assignee: Nutap Schuhl & Co. GmbH, Hagen, Germany

[21] Appl. No.: 188,067

[22] Filed: Jan. 26, 1994

[30] Foreign Application Priority Data

Feb. 16, 1993 [DE] Germany ............... 43 04 583.9

[51] Int. Cl.⁶ .................................................. B23G 5/06
[52] U.S. Cl. ................................... 470/98; 470/198
[58] Field of Search ............................. 470/18, 25, 96, 470/98, 102, 103, 104, 198, 204; 407/33, 42; 408/207, 208, 209, 226

[56] References Cited

U.S. PATENT DOCUMENTS

| | | | |
|---|---|---|---|
| 678,814 | 7/1901 | Riggs | 470/198 |
| 1,535,184 | 4/1925 | Smith | 470/18 |
| 1,912,764 | 6/1933 | Sherbinin et al. | 470/102 |
| 2,051,086 | 8/1936 | Johnson | 470/98 |
| 4,229,126 | 10/1980 | Harrow | 470/167 |

*Primary Examiner*—Lowell A. Larson
*Assistant Examiner*—Thomas C. Schoeffler
*Attorney, Agent, or Firm*—Herbert Dubno

[57] ABSTRACT

Immediately behind a tap of an automatic threading machine to which nuts or like pieces are fed in succession, is a straight portion of a cast-off sheet coaxial with the tap and which is followed by an inclined portion including an obtuse angle with the straight portion. Another straight portion parallel to the first includes an obtuse angle with the inclined portion and guide passages are formed around the inclined portion and the final parallel portion in a head which is rotated to drive the tap. The nuts thus pass over the tap and the cast-off shaft and axial play of the cast-off shaft is minimized.

10 Claims, 2 Drawing Sheets

PASS-OVER TAPPING APPARATUS

FIELD OF THE INVENTION

The present invention relates to a pass-over type of tapping apparatus which has a tap or thread cutter capable of forming an internal thread in a nut or similar workpiece which, upon completion of the formation of the thread along the inner wall of a bore previously formed therein, passes over the thread cutter and onto a cast-off shaft from which the nuts or other workpieces are ultimately thrown. The workpiece is held against rotation during the cutting of the thread while the thread cutter is rotated. The cast-off shaft behind the thread cutter is usually provided with a smooth surface.

BACKGROUND OF THE INVENTION

In thread cutters of the aforedescribed type, an internal thread is provided on workpieces, for example prebored nuts, while they are held against rotation but are allowed to move over the thread-cutting region onto the smooth-surfaced shaft. Thus after the generation of the thread in the workpiece, the now-threaded workpiece passes from the end of the thread cutter or tap onto the shaft from which the individual workpieces or nuts can be thrown.

Conventional thread cutting machines of this type can operate at a cutting speed of 75 m/minute and at rotary speeds, for example, for M8 nuts (utilizing the European designation system) of 3000 rpm. While higher cutting speeds are possible, rotary speeds in excess of 3000 rpm could not be exceeded prior to the present invention without creating significant difficulties in the manner in which the nuts are cast off the shaft centrifugally.

Various configurations of the shafts used in prior art machines are known. In most cases, a shaft extending at a right angle to the thread cutter portion has been used. With such systems, there is the disadvantage that the thread cutting member cannot be rotated precisely coaxially with the bore of the article to be threaded and centrally thereof, because the force application to the rotary parts can occur only at the outer ends of the curved shaft so that the latter, in its rotary movement, will describe the surface of cone whose apex angle and dimensions will be dependent upon the difference between the shaft diameter of the thread cutter and the basic bore in the part to be threaded as well as the difference between the outer diameter of the part to be internally threaded and the inner diameter of its guide, for example, its guide sleeve, for that portion of the latter already filled with threaded workpieces.

In practice, therefore, the thread which is fabricated is always larger than the diameter of the thread cutter or tap. Maintenance of narrow thread tolerances is practically impossible.

A further drawback of such pass-over tapping machines is that the workpiece which can pass along the curved shaft can have only a limited height or axial dimension, i.e. a height of at most 1.5 times the thread diameter to prevent binding of the workpiece in its travel along the shaft. Greater axial lengths or heights may result in catching of the workpiece on the shaft and a failure of the shaft to adequately cast off the individual workpieces.

During the centrifugal cast-off action, an axial counterforce is applied to the workpieces which remain on the thread cutter so that during the cutting operation there is a higher flank pressure which can result in excessive tool wear.

The radial discharge of the finished workpieces from the angled shaft is effected with such high outward velocity that the workpieces which have previously collected in the basket and the workpieces flung off from the shaft may be damaged by impact with one another.

Finally it may be mentioned that a relatively large back and forth movement of the tap is required in these conventional machines to ensure reliable operation and that is disadvantageous with respect to the production rate.

Pass-over types of tapping machines are also known in which the shaft at the end is initially radially outwardly curved and then provided with a radially inward curvature. These devices have not been found to be satisfactory in practice because additional forces are applied to the shaft and the thread cutter, at least in part because it is then necessary to displace the threaded workpieces counter to the centrifugal force. Here again the tool wear is inordinately increased and the dimensional tolerances within which the threads are fabricated can become excessive. As a result, tapping machines of this type are practically no longer in use.

OBJECTS OF THE INVENTION

It is the principal object of the present invention to improve upon the workpiece tapping machines described above and provide a pass-over thread cutting system which enables with relatively reduced tool wear, internal threads to be fabricated with high precision.

Another object of the invention is to provide a pass-over type of thread cutting machine which enables individual workpieces to be threaded as they pass from the tap or thread cutting tool onto a cast-off shaft and also ensures the casting off of the threaded workpieces in such manner that damage to the workpieces is minimized.

It is also an object of this invention to provide an improved tapping assembly, i.e. combination of cast-off shaft and thread cutter, which will overcome drawbacks of the earlier systems.

Finally it is an object of the invention to provide an improved tapping machine for individual workpieces intended to pass over the tap or cutting tool which has higher outputs of smaller tolerance threaded workpieces than earlier thread-cutting machines and especially the prior art thread-cutting machines mentioned above.

SUMMARY OF THE INVENTION

These objects are attained, in accordance with the invention by so offsetting the shaft that it comprises initially at the thread-cutting region a smooth shaft portion which is coaxial with the tap or thread cutter, has an obtuse-angled smooth region (intermediate region) and a terminal shaft portion extending parallel to the axis of the first portion of the thread cutter and connected to the obtuse-angled portion.

It should be understood that, when reference is made to an obtuse-angled portion, it is intended to indicate that the angle included between the two portions is an obtuse angle, i.e. an angle greater than 90° and less than 180° which can correspond to an acute angle of offset of the axes of the two parts which adjoin in an obtuse angle. For example an obtuse angle portion may be formed by bending the shaft so that its axis is offset at an acute angle from the axis of the portion at each end of this intermediate portion.

More particularly, the pass-over tapping apparatus can comprise:

a cast-off shaft from a smooth trailing end of which tapped workpieces are discharged;

a thread cutter at a leading end of the cast-off shaft for cutting an internal thread in a workpiece blank to form a tapped workpiece, the tapped workpieces passing in succession over the thread cutter and along the cast-off shaft, the cast-off shaft being an offset shaft having:

a straight upstream portion formed with the leading end and coaxial with the thread cutter, a straight intermediate portion including an obtuse angle with the upstream portion, and a straight downstream portion including an obtuse angle with the intermediate portion and parallel to the upstream portion;

means for rotating the cast-off shaft and the thread cutter about an axis of the thread cutter while each workpiece in which a thread is cut is held against rotation to effect cutting of the respective thread and cause the respective workpiece to advance axially on the thread cutter and pass to the trailing end of the cast-off shaft by shifting of preceding workpieces along the shaft by workpieces following from the thread cutter and means for collecting tapped workpieces cast off from the trailing end.

The assembly for use in a pass-over tapping apparatus will thus comprise:

a cast-off shaft from a smooth trailing end of which tapped workpieces are discharged; and a thread cutter at a leading end of the cast-off shaft for cutting an internal thread in a workpiece blank to form a tapped workpiece, the tapped workpieces passing in succession over the thread cutter and along the cast-off shaft, the cast-off shaft being an offset shaft having:

a straight upstream portion formed with the leading end and coaxial with the thread cutter, a straight intermediate portion including an obtuse angle with the upstream portion, and a straight downstream portion including an obtuse angle with the intermediate portion and parrallel to the upstream portion.

With this configuration, I can ensure that the casting off of the workpieces at the free end of the shaft opposite the tap or thread cutter can be at a reduced radial speed, that there is practically no flank pressure on the workpieces where they engage the thread cutter or tap, and hence that there is no flank pressure which can increase the wear of the cutting tool.

Because of the fact that the portion of the shaft directly behind the thread cutter is parallel to and aligned axially with the tap, the guidance of the workpieces parallel to the tap is two fold, i.e. directly behind the tap at the upstream portion of the shaft and in the region of the cast-off end at the downstream portion of the shaft so that all wobbling motions of the shaft and tap can be avoided.

As a consequence, the internal threads can be formed in the workpieces with high precision and narrow thread tolerances.

By the obtuse-angled configuration of the intermediate portion of the shaft, I can ensure the rearward displacement of the workpieces by centrifugal action to enable the discharge of the individual workpieces by the forces contributed centrifugally and without the need for other means for axially advancing the workpieces along the shaft. The workpieces are cast off from an end of the shaft which is parallel to the tap axis, rather than radial, so that especially high centrifugal forces are not applied to the workpieces as they leave the shaft end and thus the workpieces can collect in an undamaged manner.

Because of the particular inclination of the intermediate portion, threaded workpieces can be fabricated which have an axial length or height of say three times the thread diameter so that the versatility of the machine is greatly enhanced by comparison with conventional machines with curved shaft ends. In addition the overall length of the apparatus can be reduced by comparison with the latter machines which improves the force transmission to the tap and allows workpieces with materials which are poorly machinable or are difficult to machine, to be tapped without requiring excessively high torque development in the shaft.

In practice, the invention has been found to permit cutting speeds in excess of 150 m/minute and the threading of M8 nuts at rotary speeds of 6000 rpm, without damaging the workpieces as they are cast off the shaft.

The tapping assembly can be introduced into tapping machines without requiring the tap to have excessive movement in the longitudinal or axial direction. As a consequence, the advance and retraction movements of the elements feeding the workpieces to the tap can be shorter, thereby contributing to the output or machining rate of the apparatus.

Preferably the angles are in the range of 150° to 160°, corresponding to acute angles between axes of the upstream or downstream portion and an axis of the intermediate portion of 20° to 30°. More specifically, the obtuse angles can be in the range of 155° to 158° corresponding to similarly measured acute angles between 22° and 25°.

Advantageously, the pass-over tapping apparatus described further comprises:

housing means forming a channel having portions receiving the intermediate portion and the downstream portion, respectively, and surrounding the shaft with slight clearance from the workpieces whereby the workpieces pass through the channel portions along the shaft, the housing means being rotatable about the axis of the thread cutter and the upstream stream portion and forming the means for rotating; and an annular chamber at which the channel opens axially and formed in the housing means for receiving workpieces cast off the trailing end of the shaft, the annular chamber being provided with a radial outlet, the shaft having an axial play relative to the housing means of at most the order of millimeters.

The axial play can be 4 to 8 mm and preferably is 5 mm. The portion of the channel receiving the intermediate portion of the shaft is of a diameter greater than a maximum diameter of the intermediate portion filled with the workpieces to form an axial play for the thread cutter of about 5 mm.

The apparatus can include, in addition, a device for individually supplying the workpieces, e.g. nuts to the tapping region, a feeder or advancing system for individually advancing the workpieces to the thread-cutting arrangement and the means for holding the individual workpieces against rotation.

The 5 mm diameter difference by which the guide passage is greater than the workpieces contained therein will allow about 5 mm of axial movement of the tap back and forth which suffices for the insertion of the filled tap and shaft into the guide passage and a sufficient play for the operations described.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

Figure 1:
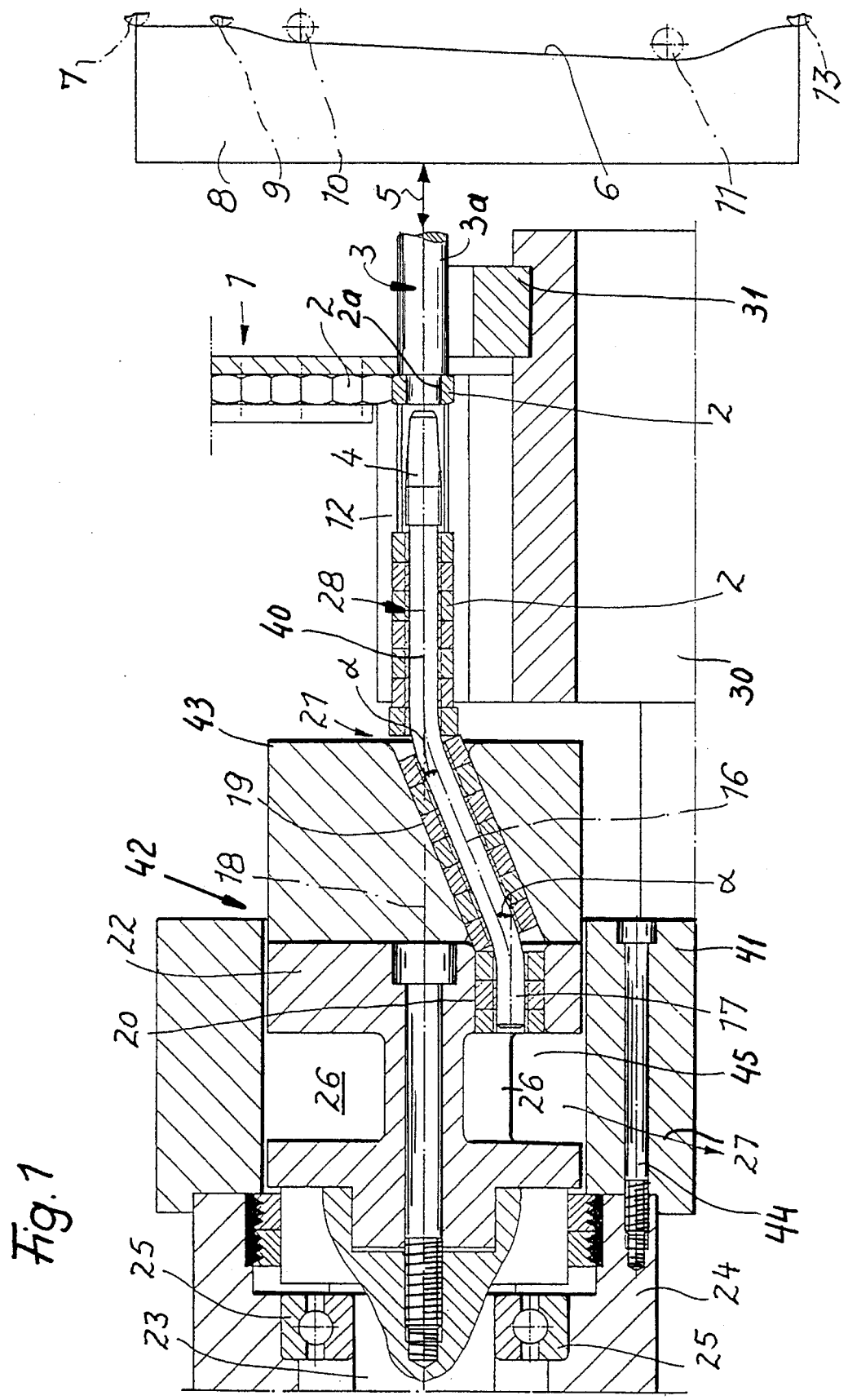
FIG. 1 is a tapping machine seen in partial cross section according to one embodiment of the invention.

The internal thread machine shown in FIG. 1 comprises an individual feed device 1, e.g. a vertical magazine in which the individual workpieces are threaded, here hexagonal nuts 2, are advanced into alignment with the thread-cutting tool or tap 4. The workpieces 2 have internal bores 2a which have previously been formed therein. The flats of the nuts 2 may be held in a guide 12 preventing rotation of the nuts while they are threaded.

By means of a feeder 3, the workpieces 2 are individually fed into engagement with the tap 4. In this case, the feed device can comprise a ram or plunger 3a displaceable axially back and forth as represented by the arrow 5 by a cam 6 on a disk 8 which has been shown in its developed form in FIG. 1 at the right-hand side thereof. Positions of the cam follower have been illustrated at 7, 9, 10, 11, 13, the cam follower being coupled to the ram 3. While a free cam surface has been represented at 6, the cam 8 is preferably a slave cam.

The position 7 corresponds to the position of the ram 3 shown in FIG. 1. Upon rotation of the disk 8, the ram 3a is initially moved into position 9 of the cam 6, whereupon between the positions 9 and 10, the nut 2 is shifted to engage the leading end of the tap 4. The ram 3a then follows the movement of the nut onto the tap in which the travel of the cam follower between the positions 10 and 11. When the nut 2 is fully engaged on the tap 4, the ram 3 can be retracted (by movement of the cam follower) between the positions 11 and 13, to permit a new nut 2 to drop from the magazine 1 into alignment with the tap 4. The tap 4 is rotated about the axis 18 by means which will be described and, as it is rotated relative to the stationary but axially-movable nut 2, cuts the thread in the latter. As the thread is cut into the nut, the nut advances over the tap 4 in the guide 12.

The leading end of the tap is thus centered by the successive nuts in the guide 12. By the rotation of the tap, an internal thread is formed in the successive nuts and as the nuts pass over the tap 4, they are deposited upon the upstream straight portion 28 of a shaft 40 which directly follows the tap 4 and is coaxial with the tap 4.

Figure 2:
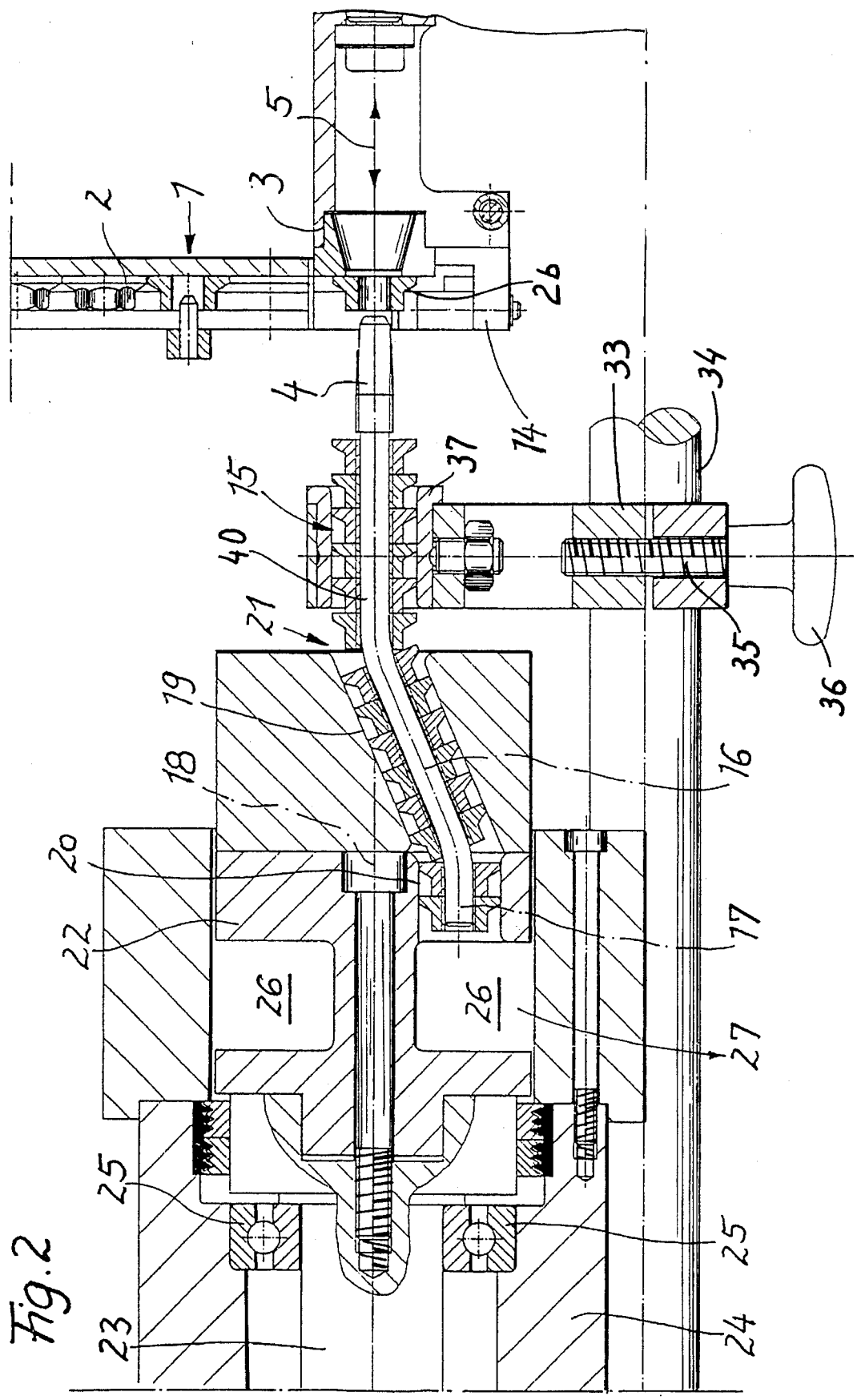
FIG. 2 is a similar view of a second embodiment.

While in the embodiment of FIG. 1, the nuts 2 are guided axially over the tap 4 and over the upstream portion of the shaft, the guide 12 forms part of a housing 30 relative to which the tap can rotate and carrying the magazine 1 and a guide 31 for the ram 31, in the embodiment of FIG. 2, the magazine 1 is provided on a holder 14 which is separate from a bracket 33 which can be shifted along a guide 34 and locked in place by a threaded spindle 35 controlled by a hand wheel 36 and carrying the guide passage 15 in the form of a bushing 37 secured to the bracket. In this case, the holder 14 may be shiftable together with the workpiece 2, here having frustoconical seats 2b, over the tap 4. The leading end of the tap 4 is thus centered by the nuts in the holder 14 while rearwardly of the tap 4, the shaft is centered by nuts in the guide passage 15.

In both embodiments, the shaft 40 has an upstream straight portion exactly aligned with the tap 4 and serving in part to center the latter via the nuts or threaded workpieces carried thereon. Rearwardly of the straight portion, represented at 28 in FIGS. 1 and 2, an inclined portion 16 of the shaft 40 is provided to include an obtuse angle with the straight axial extending portion 28 and is followed by a cast-off portion 17 which is parallel to the upstream portion 28. The shaft is rotated about the axis 18 so that the downstream portion 17 and the inclined portion 16 orbit this shaft while the portion 28 is rotated precisely about this axis. The housing 30 is connected to a housing 41 in which a head 42 is rotatable, this head including a part 22 formed with a guide passage 20 and a part 43 formed with a guide passage 19 respectively receiving the portions 17 and 16 of the shaft.

The dimensions of the guide passages 19 and 20 are so selected that the workpieces 2 can pass between the shaft portions and the walls of these channels and, with the shaft full of nuts or other workpieces, the latter can be inserted into the guide channel 19, 20, from its mouth 21.

The rotatable body 22 is connected with a drive shaft 23 journaled in the housing by a bearing 25. The drive shaft 23 can be connected to a motor which can be mounted on the housing portion 24 bolted to the housing portion 41 at 44.

At 26, the channel 20 opens into an annular chamber in the form of a deep groove which is open radially downwardly and can discharge nuts collected in the channel 26 in the radial direction represented by the arrow 27. A portion of an opening 45 is shown for that purpose.

The shaft 40 (16, 17, 28) and the tap 4 form a pass-over thread cutter which is offset along its length and has a coaxial region represented at 28 connected by an obtuse angle with the inclined region 16 which is also connected by an obtuse angle with the trailing segment 17 of the shaft parallel to the upstream segment 48. The angle of offset represented at $\alpha$ in each case amounts to 22° to 25°. Because the nut-filled shaft is guided in the trailing end region 17 and in the region 28 of shaft 40 parallel to the axis of shaft portion 17, precise guidance of the shaft and cutter can be achieved during the rotation about axis 18, thereby ensuring a high dimensional precision of the thread which is cut into each nut. Since a centrifugal force is applied to the nuts on the inclined portion 16 of the shaft, the nuts are always advanced along the shaft and can be discharged at the end portion 17 practically free from centrifugal force.

As a result the finished workpieces can collect in the groove 26 free from damage or impact and discharged through the outlet 45 in the direction of arrow 27.

The casting off of the workpieces 2 can be effected without axial shift of the assembly 16, 17, 40, 4 or with a minimum axial shifting thereof (e.g. a maximum of 5 mm) along the axis 18, so that the stroke of the feed ram 3a can be limited.

In the embodiment shown in FIG. 1, workpieces are pushed by the ram 3 onto the tap 4 and over the tap onto the shaft so that the ram 3 can be immediately retracted. In the embodiment of FIG. 2 the feed of the feeding unit 3 is maintained until the workpiece has passed over the tap 4.

The invention is not limited to the specific embodiments described but includes all combinations of new elements disclosed and modifications of the disclosed element within the spirit and scope of the appended claims.

I claim:

1. A pass-over tapping apparatus which comprises:

a cast-off shaft from a smooth trailing end of which tapped workpieces are discharged;

a thread cutter at a leading end of said cast-off shaft for cutting an internal thread in a workpiece blank to form a tapped workpiece, the tapped workpieces passing in succession over said thread cutter and along said cast-off shaft, said cast-off shaft being an offset shaft having:

a straight upstream portion formed with said leading end and coaxial with said thread cutter, a straight intermediate portion disaligned from said upstream portion and including an obtuse angle with said upstream portion, and a straight downstream portion disaligned from said intermediate portion and including an obtuse angle with said intermediate portion and parallel to said upstream portion;

means for rotating said cast-off shaft and said thread cutter about an axis of said thread cutter while each workpiece in which a thread is cut is held against rotation to effect cutting of the respective thread and cause the respective workpiece to advance axially on said thread cutter and pass to said trailing end of said cast-off shaft by shifting of preceding workpieces along the shaft by workpieces following from said thread cutter; and means for collecting tapped workpieces cast off from said trailing end.

2. The pass-over tapping apparatus defined in claim 1 wherein said angles are in the range of 150° to 160° corresponding to acute angles included between axes of said upstream and downstream portion and an axis of said intermediate portion of 20° to 30°.

3. The pass-over tapping apparatus defined in claim 2 wherein said angles are in the range of 155° to 158° corresponding to acute angles included between axes of said upstream and downstream portion and an axis of said intermediate portion of 22° to 25°.

4. The pass-over tapping apparatus defined in claim 1, further comprising:

housing means forming a channel having portions receiving said intermediate portion and said downstream portion, respectively, and surrounding said shaft with slight clearance from said workpieces whereby said workpieces pass through said channel portions along said shaft, said housing means being rotatable about said axis of said thread cutter and said upstream portion and forming said means for rotating; and an annular chamber at which said channel opens axially and formed in said housing means for receiving workpieces cast off said trailing end of said shaft, said annular chamber being provided with a radial outlet, said shaft having an axial play relative to said housing means of at most the order of millimeters.

5. The pass-over tapping apparatus defined in claim 4 wherein said axial play is 4 to 8 mm.

6. The pass-over tapping apparatus defined in claim 5 wherein said axial play is 5 mm.

7. The pass-over tapping apparatus defined in claim 4 wherein the portion of said channel receiving said intermediate portion of said shaft is of a diameter greater than a maximum diameter of said intermediate portion filled with said workpieces to form an axial play for the thread cutter of about 5 min.

8. An assembly for use in a pass-over tapping apparatus, comprising:

a cast-off shaft from a smooth trailing end of which tapped workpieces are discharged; and a thread cutter at a leading end of said cast-off shaft for cutting an internal thread in a workpiece blank to form a tapped workpiece, the tapped workpieces passing in succession over said thread cutter and along said cast-off shaft, said cast-off shaft being an offset shaft having:

a straight upstream portion formed with said leading end and coaxial with said thread cutter, a straight intermediate portion disaligned from said upstream portion and including an obtuse angle with said upstream portion, and a straight downstream portion disaligned from said intermediate portion and including an obtuse angle with said intermediate portion and parallel to said upstream portion.

9. The assembly for use in a pass-over tapping apparatus, as defined in claim 8, wherein said angles are in the range of 150° to 160° corresponding to acute angles included between axes of said upstream and downstream portion and an axis of said intermediate portion of 20° to 30°.

10. The pass-over tapping apparatus defined in claim 9 wherein said angles are in the range of 155° to 158° corresponding to acute angles included between axes of said upstream and downstream portion and an axis of said intermediate portion of 22° to 25°.

* * * * *